United States Patent [19]

Agnew et al.

[11] Patent Number: 5,278,763
[45] Date of Patent: Jan. 11, 1994

[54] NAVIGATION AIDS

[75] Inventors: Hugh J. Agnew, West Perth; Roger K. Woolley, Kelmscott, both of Australia; Gwyn D. Parfitt, Kowloon, Hong Kong

[73] Assignee: Qudos SA, Luxembourg

[21] Appl. No.: 682,862

[22] PCT Filed: May 15, 1987

[86] PCT No.: PCT/GB87/00338

§ 371 Date: Mar. 4, 1988

§ 102(e) Date: Mar. 4, 1988

[87] PCT Pub. No.: WO87/07013

PCT Pub. Date: Nov. 19, 1987

Related U.S. Application Data

[63] Continuation of Ser. No. 582,134, Sep. 12, 1990, abandoned, which is a continuation of Ser. No. 143,153, Mar. 4, 1988, abandoned.

[30] Foreign Application Priority Data

May 16, 1986 [GB] United Kingdom ............... 8612002
Jul. 4, 1986 [GB] United Kingdom ............... 8616401

[51] Int. Cl.⁵ .................................................. G06F 15/50
[52] U.S. Cl. ....................................... 364/443; 364/449; 342/452; 73/178 R
[58] Field of Search ........................ 364/443, 444, 449; 342/452; 340/990, 995; 73/178 R; 33/1 M

[56] References Cited

U.S. PATENT DOCUMENTS

| | | | |
|---|---|---|---|
| 3,725,919 | 4/1973 | Jones et al. | 342/452 |
| 3,967,098 | 6/1976 | Harnagel et al. | 364/443 |
| 4,053,893 | 10/1977 | Boyer | 342/452 |
| 4,086,632 | 4/1978 | Lions | 342/452 |
| 4,192,002 | 3/1980 | Draper | 364/449 |
| 4,253,150 | 2/1981 | Scovill | 364/449 |
| 4,283,763 | 8/1981 | Bylinsky et al. | 342/452 |
| 4,393,448 | 7/1983 | Dunn et al. | 364/449 |
| 4,428,057 | 1/1984 | Setliff et al. | 364/449 |
| 4,796,190 | 1/1989 | Cummings | 364/443 |
| 4,862,374 | 8/1989 | Ziemann | 364/449 |

FOREIGN PATENT DOCUMENTS

2043909A 10/1980 United Kingdom.

Primary Examiner—Gary Chin
Attorney, Agent, or Firm—Cobrin Gittes & Samuel

[57] ABSTRACT

An electronic cursor (12) is movable over a digitising table (10) on which a chart (16) has been spread. The cursor can give an indication of which way it should be moved to reach a defined position on the chart. The cursor can also convert positions in terms of x, y coordinates of the table into positions in terms of latitude and longitude co-ordinates of the chart, and can display the chart positions. The cursor can also determine bearings and distances between its own position and a defined position. Several other facilities are also available. Thus, the cursor can be used to facilitate the plotting of positions and courses on the chart and in reading off positions and bearings from the chart.

27 Claims, 6 Drawing Sheets

NAVIGATION AIDS

This is a continuation of application Ser. No. 07/582,134, filed Sep. 12, 1990, which is a continuation of application Ser. No. 07/143,153, filed Mar. 4, 1988, both now abandoned.

This invention is concerned with facilitating the plotting of points on a map or navigational chart and with taking data off a chart.

Traditionally, positions are plotted on a chart by drawing intersecting positions-lines determined from observations, measurements and/or calculations, and further positions can be plotted using the dead-reckoning or estimated position methods involving calculations of speed, course, set and drift. The further positions and bearings can then be read-off the chart using instruments and the charts scale and compass markings. Such methods are time consuming and laborious, and requires a degree of expertise with navigational drawing instruments such as a parallel-ruler and dividers or other manual mechanical chart plotting and reading aids.

A very expensive partial replacement for the traditional plotting method is provided by a plotting table which receives an input or inputs from one or more external navigation aids and projects a light beam onto or draws a line at the corresponding location on the chart. In addition to being expensive, such equipment takes up a substantial amount of space and is heavy, and is therefore not particularly suited to anything but large ships.

Electronic chart systems are also being developed to assist in navigation. These have the disadvantages of high cost, the requirement of a cathode ray tube as the chart display, a lack of high resolution in the displayed output, and the lack of a permanent paper record of the output.

A basic navigation aid is described in British Patent Application No. GB 2043909A. In that known aid, a digitising table is employed, on which a chart is placed. A cursor cooperating with the table is movable over the chart and provides a signal which is decoded to give the coordinates in latitude and longitude of the cursor position relative to the chart. The actual position in latitude and longitude of the vehicle being navigated is known from a signal provided by a navigation computer. The actual position signal and the cursor position signals are compared, and an indication is provided by means of lamps on the cursor as to the direction (up, down, right or left) in which the cursor should be moved in order that the cursor and actual positions coincide.

Thus, this known arrangement simply provides a position plotting device, and relies on a signal indicating the actual position of the vehicle.

The present invention seeks to provide a navigation aid which includes certain improvements over the basic aid described in GB 2043909A.

In accordance with a first aspect of the present invention, there is provided a navigational aid comprising a charting surface, A Cursor device movable over the surface, means to provide a signal indicative of the current position of the cursor device on the surface, and means to convert the current cursor position signal from being in terms of a coordinate system of the charting surface to a chart-based signal indicative of the current position of the cursor device in terms of a coordinate system of the chart, characterised by means to store the chart-based signal.

This feature thus enables a position to be conveniently entered by placing the cursor device on that position. Once that is done, it opens up the possibilities for a number of useful calculations to be performed.

For example, the aid may include means to calculate from the stored chart-based signal and the current chart-based signal the distance and bearing of the current position from the stored position and/or vice versa, and means to display the distance and bearing. With this feature, given the bearings of one's current position from two landmarks, or one's bearing and distance from a single landmark, it is a simple matter to plot one's current position on the chart.

Additionally, the-store means may be arranged to store a plurality of such chart-based signals. The aid may then further include means to calculate from the current chart-based signal and from a first and second of such stored chart-based signals the distances of the current position along and off a course from the first to second stored positions. With this feature a number of waypoints may be stored and one's progress along the planned course can be displayed.

In accordance with a second aspect of the present invention, there is provided a navigational aid comprising a charting surface for use with a chart having a coordinate system, a cursor device movable over the surface, means to provide a surface-based signal indicative of the current position of the cursor device on the surface in terms of a coordinate system of the charting surface, and means to convert the surface-based signal to provide a chart-based signal indicative of the current position of the cursor device in terms of the chart coordinate system, characterised by means to reference the chart coordinate system with respect to the surface coordinate system in dependence upon the positions of at least two points on the surface and the coordinates of those positions in terms of the chart coordinate system, the converting means being responsive to the referencing means to provide the conversion.

Thus, the chart may be placed on the charting surface in an arbitrary position and yet, after referencing, the position of the cursor can be determined in terms of the chart coordinate system (for example longitude and latitude).

In one arrangement, the referencing means may include means to input manually the coordinates of said positions in terms of the chart coordinate system. In order to avoid the necessity for entering the coordinates every time a particular chart is re-used, the aid may further include means to store for each of a plurality of charts the coordinates of reference points marked on the respective chart, means to retrieve the stored coordinates for a selected one of charts, and means to re-reference the selected chart in dependence upon the retrieved coordinates and the positions of the marked reference points on the charting surface.

In an alternative arrangement the chart may have marked reference points and coded information (such as a bar code) of the coordinates of the marked reference points, the aid further including means to read the coded information. Thus, there is no need to manually enter the coordinates of referencing points on the chart.

In accordance with a third aspect of the present invention, there is provided a navigational aid comprising a charting surface, a cursor device movable over the surface, means to provide a signal indicative of the current position of the cursor device on the surface, and means to convert the current cursor position signal from being in terms of a coordinate system of the charting surface to a chart-based signal indicative of the current position of the cursor device in terms of a coordinate system of the chart, characterised by means to display on the cursor device data related to the current position of the cursor device on the surface in terms of units derivable from the chart coordinate system.

Thus, the aid provides a readily visible read-out of data in meaningful units.

The display may be capable of displaying for example, the current cursor position, in which case the coordinates of any location on the chart can be read out in, for example, terms of latitude and longitude.

The aid may further comprise means to store a position, and be characterised further in that the display is capable of displaying the distance and bearing of the current cursor position from the stored position and/or vice versa. Furthermore, provision may be made to store a plurality of positions, the display being capable of displaying the distances of the current cursor position along and off a course from one to another of the stored positions.

Although it is useful to provide, in a digitising table/cursor arrangement, a keypad on the cursor for entering data, mis-keying of data can be a problem. In accordance with a fourth aspect of the present invention, there is provided a navigational aid comprising a charting surface, a cursor device movable over the surface, means to provide a signal indicative of the current position of the cursor device on the surface, and means for manually entering data via the cursor device, characterised in that the data to be entered is variable prior to entry in dependence upon movement of the cursor device with respect to the charting surface. Preferably, the aid also includes means to display the data on the cursor device. Thus, is the data which is about to be entered can be readily viewed and can be "ramped" up and down prior to entry by movement of the cursor device.

In accordance with a fifth aspect of the present invention, there is provided a navigational aid comprising a charting surface, a cursor device movable over the surface, means to provide a signal indicative of the current position of the cursor device on the surface, and means to process the current position signal, characterised by means to transmit the processed signal to an external apparatus.

The aid may be used to transmit signals to a satellite navigation system, for example, and provides a convenient and simple way of entering data into such a system.

Preferably, the processing means includes means for converting the current cursor position signal from being in terms of a coordinate system of the charting surface to a chart-based signal indicative of the current position of the cursor device in terms of a coordinate system of the chart, the transmitting means being arranged to transmit the chart-based signal. Thus, signals providing data in terms of, for example, latitude and longitude can be transmitted to the external apparatus.

The processing means may include means to store a plurality of such chart-based signals for different cursor positions, the transmitting means being arranged to transmit the signals as a series of way-point position signals.

Other preferred features of the invention will be apparent from the claims and from the following specific description, given by way of example, of an embodiment of the invention with reference to the drawings.

Construction

Figure 1:
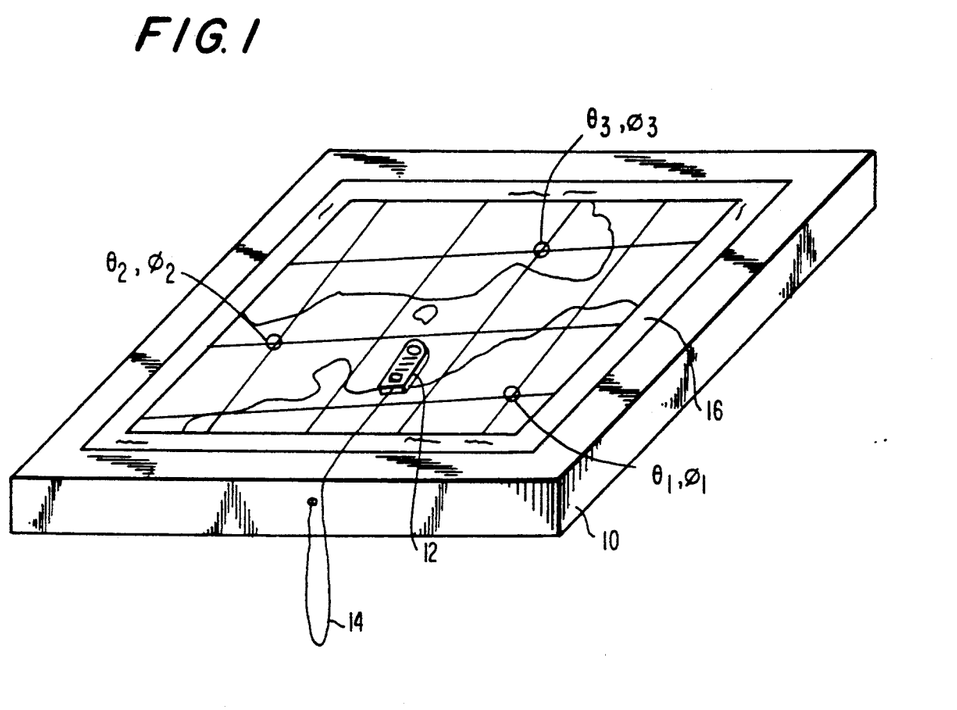
FIG. 1 is a schematic perspective view of a navigation aid.

Referring to FIG. 1, the navigation aid comprises a digitising table 10 and a cursor or mouse 12 connected to the table 10 via a signal line 14. By means of a sensor coil in the cursor and a grid of wires beneath the surface of the table, it is possible to determine the position in terms of x and y coordinates of the cursor on the table. A chart 16 is spread across the table 10 approximately squarely on the table, and the cursor is freely movable by hand across the chart.

Figure 2:
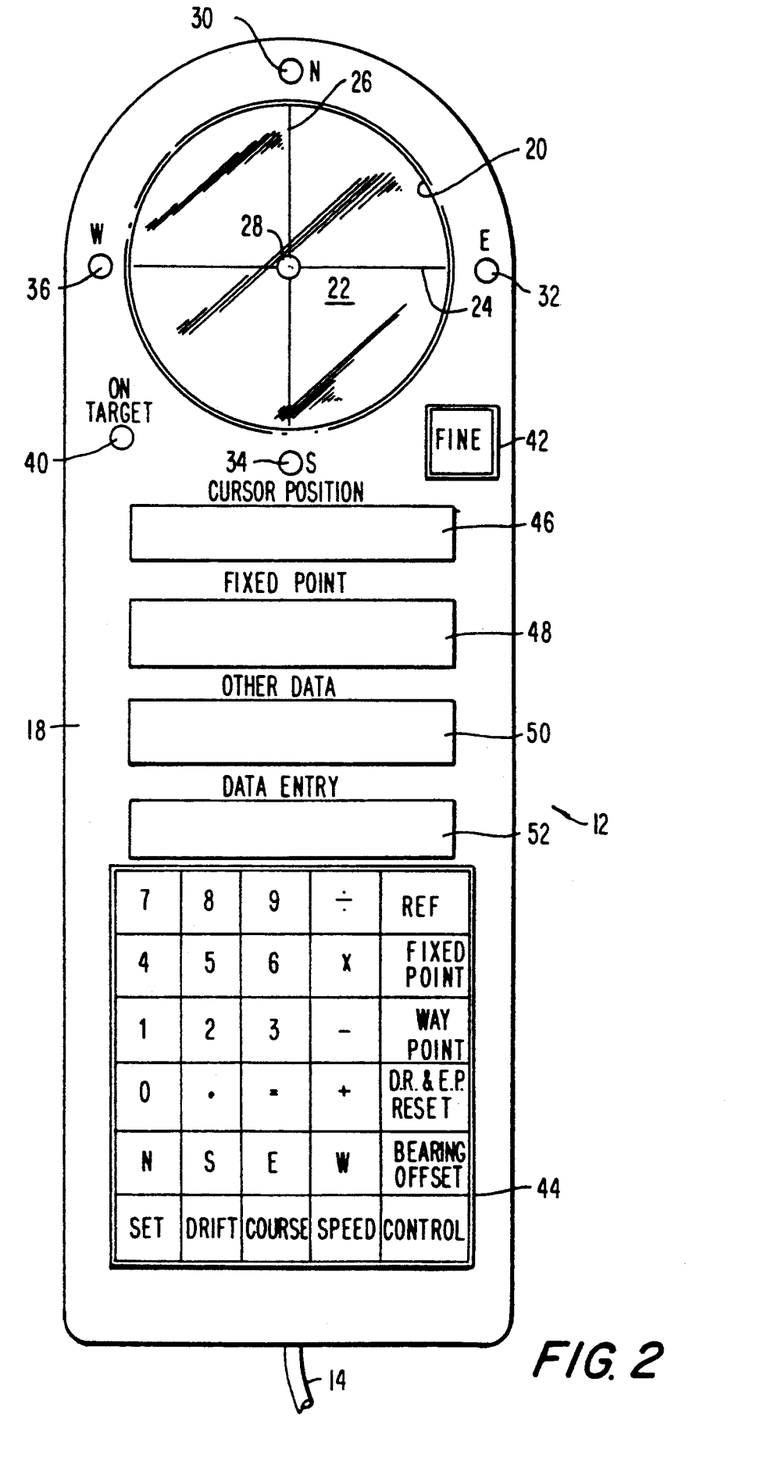
FIG. 2 is a plan view of the cursor of the navigation aid.

Referring to FIG. 2, the cursor 12 has an elongate housing 18 formed with a through-hole 20 at one end. A transparent disc 22 is fitted across the base of the through-hole and is marked with cross-hair lines 24, 26. A hole 28 is formed through the disc 22 at the intersection of the cross-hair lines 24, 26 so that a pencil can be used to mark the chart through the hole 28 at the intersection of the lines 24, 26. The sensor coil is mounted in the housing around the hole 20 so that the determined position of the cursor 12 corresponds to the position of the hole 28.

Four LED indicators 30 to 36 designated "North", "East", "South" and "West", respectively, are arranged around the hole 20, and a further LED indicator 40 designated "On Target" and a "fine" push button 42 are disposed adjacent the hole 20.

At the other end of the housing 18, there is a keypad 44, and in between the keypad and hole 20, there are four LCD displays 46 to 52 designated "Cursor Position", "Fixed Point", "Other Data", and "Data Entry", respectively.

Figure 3:
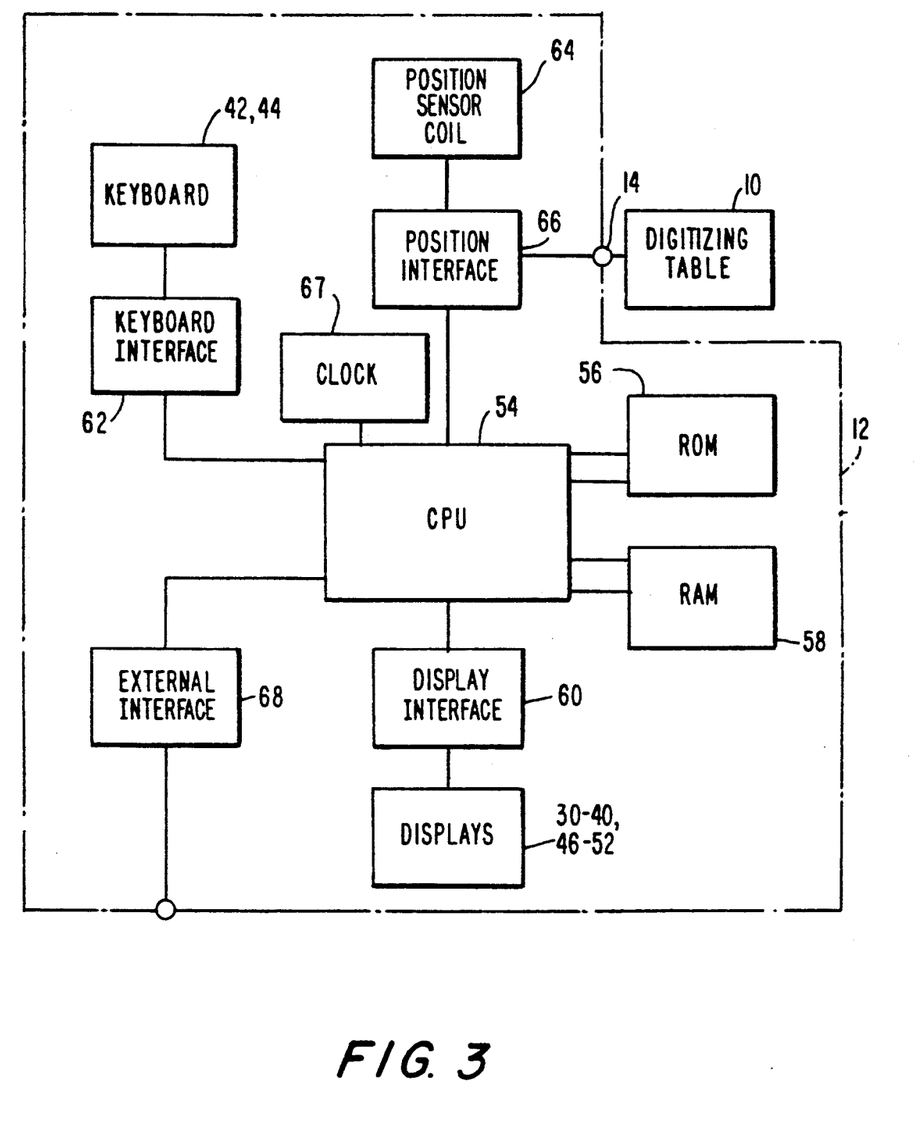
FIG. 3 is a block diagram of the circuitry of the aid.

Referring to FIG. 3, the cursor 12 contains within its housing a central processor unit (CPU) 54 with associated read only memory (ROM) 56 storing the operating program of the cursor and random access memory (RAM) 58 for storing data. The CPU 54 drives the LED displays 30–40 and the LCD displays 46–52 via a display interface 60. The CPU 54 also receives signals from the keyboard 42 and rush-button 44 via a keyboard interface 62. The sensor coil 64 in the cursor and the digitising table 10 supply signals to a position interface 66, which can then supply position signals in terms of x, y co-ordinates of the position of the cursor 12 on the table 10 to the CPU 54. The CPU also receives a clock signal from a clock circuit 67. Lastly, the CPU can receive external information signals via an external interface 68.

There now follows a description of the operation of the navigation aid.

Referencing

Figure 4:
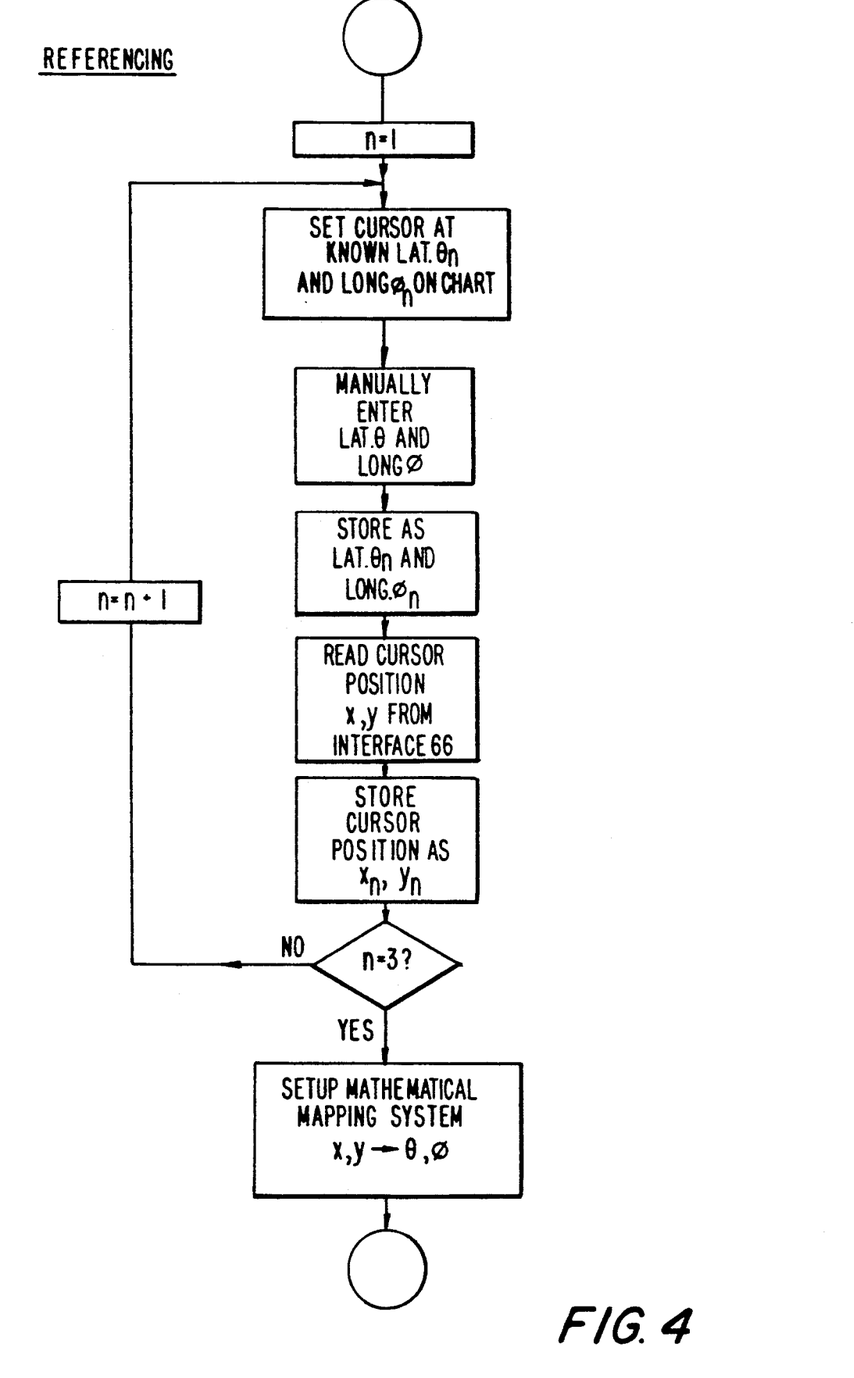
FIG. 4 is a flow diagram showing how the chart is referenced.

Before the aid can be used for plotting and reading off points on the chart, the chart 16 must firstly be referenced with respect to the digitising table. The detail of the referencing operation Is shown in the flow diagram of FIG. 4 from which it can be seen that three points of known latitude and longitude, as shown in FIG. 1, are chosen, and for each the cursor 12 is positioned at that point and the position is entered via the keyboard, for example in the form (degrees latitude), N or S, (degrees longitude), E or W, REF. As the data is entered, it is displayed on the data entry display 52. The entered data for each point is stored, as too is the sensed position of the cursor 12 on the table 10. Once all three reference points have been entered, the CPU 54 sets up a mathematical mapping system of cursor position onto latitude and longitude.

Current Cursor Position Display

Figure 5:
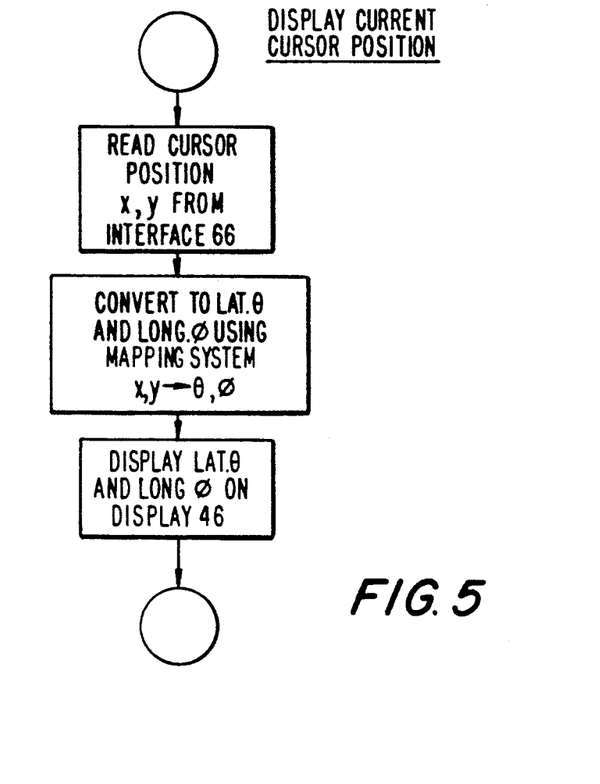
FIG. 5 is a flow diagram concerning the current cursor position display.

Once the mapping system has been set up, the current cursor position can be displayed on the display 46 by performing the steps shown in FIG. 5. The CPU 54 regularly and frequently performs these steps and thus the display 46 is continually updated. The display may take a form such as CP: (degrees latitude) N or S: (degrees longitude) E or W.

Setting a Fixed Point

A fixed point may be set by entering its position via the keyboard in the form (degrees latitude), N or S, (degrees longitude), E or W, FIXED POINT. As the position is entered it is displayed on the data entry display 52 and once it has been entered it is displayed on the fixed point display 48 in a similar form to the current position display and is also stored in the RAM 58.

Another way to enter a fixed point is to position the cursor on the required point on the chart and then enter FIXED POINT on the keyboard 44 without any prior data. The fixed point position is then set equal to the current cursor position and is stored in the RAM 58.

Moving to the Fixed Point

Figure 6:
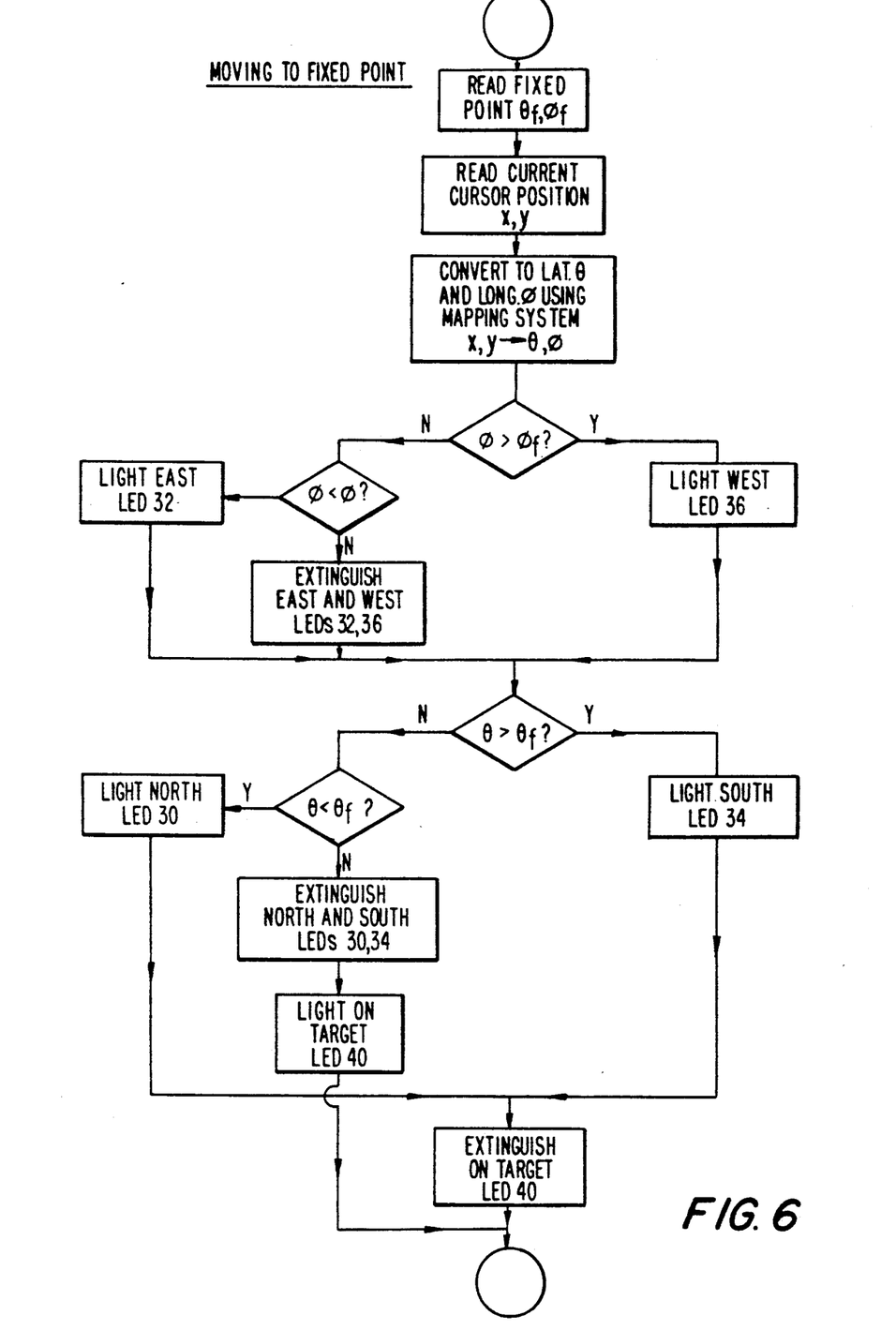
FIG. 6 is a flow diagram concerning direction indication.

Once the fixed point has been set, the CPU 54 performs the routine set out in FIG. 6 in controlling the LED displays 30 to 40. This routine is performed regularly and frequently to provide a continually updated display by the LED displays 30 to 40. It will be appreciated from FIG. 6 that the LED's indicate whether the cursor 12 should be moved North or South and East or West to reach the fixed position, and once that position is reached, the On Target LED 40 is lit.

In a modification of the routine of FIG. 6, the LED's 30 to 36 are flashed at a rate which increases as the distance of the cursor 12 from the fixed point decreases, and once the cursor is nearly on target the fine button 42 can be depressed to decrease the flashing rate by a predetermined factor.

Display of Other Data

The Other Data display 50 is capable of displaying the following forms of - other data when operating in different modes and can be advanced from one mode to the next cyclicly using the CONTROL key of the keyboard:

1. Blank Display
2. (Distance in nautical miles) NM: (Bearing to fixed point in degrees) DEG TO
3. (Distance in nautical miles) NM: (Bearing from fixed point in degrees) DEG FROM
4. (Bearing in degrees) CRS: (Speed in knots) KN
5. DR:(latitude in degrees) N or S: (longitude in degrees) E or W
6. SET (bearing in degrees) DEG: DR (rate in knots) KN
7. EP: (latitude in degrees) N or S: (longitude in degrees) E or W
8. TIME: (hours): (minutes): (seconds)
9. WP1: (latitude in degrees) N or S: (longitude in degrees) E or W
10. WP2:(latitude in degrees) N or S: (longitude in degrees) E or W
11. 1 to 2: (distance nautical miles) ALONG: (distance in nautical miles) OFF
12. WP3: (latitude in degrees) N or S: (longitude in degrees) E or W
13. 2 to 3 (distance in nautical miles) ALONG: (distance in nautical miles OFF)
14. WP4: (latitude in degrees) N or S: (longitude in degrees) E or W
15. 3 to 4 (distance in nautical miles) ALONG: (distance in nautical miles) OFF Mode 2: Distance and Bearing to Fixed Point The CPU 54 is programmed to be able to calculate, from the latitude and longitude of the current cursor position and the fixed point, the distance between them and the bearing from True North of the fixed point from the cursor position. The distance and bearing are displayed on the Other Data display 50 in the form set out above and are continually updated as the cursor is moved.

Thus, if bearings are taken from a boat of two landmarks of known position, they can successively be used as fixed points and the cursor can be used to plot on the chart two further points with appropriate bearings to the respective fixed points. The intersection of lines connecting each fixed point and the respective further point is then a plot of the current position of the boat.

Mode 3: Distance and Bearing from Fixed Point

This mode is similar to Mode 2, except that the calculated bearing is from, rather than to, the fixed point and thus differs from the bearing of Mode 2 by 180 degrees.

Mode 4: Current Course and Speed

The cursor may be connected to a digital compass and speed-sensor, via the external interface, and in Mode 4 a display is made of the course and speed in the form (bearing in degrees) CRS, (speed in knots). KN. The course and speed signals are used in calculations of positions as described below with reference to Modes 5 and 7.

In this mode the signals from the external interface may be overridden by manually entering a course and speed via the keyboard in the form (course in degrees), COURSE, (speed in knots), SPEED; and such override can be released by entering null data in the form COURSE, SPEED.

Mode 5: Dead-Reckoning Position

In this mode, or mode 7 described below, a datum dead-reckoning or estimated position may be entered in the same way as for entering a fixed point, but by pressesing D.R. & E.P. RESET rather than FIXED POINT. Thereafter from the data provided in Mode 4, and with reference to the clock 67, the CPU 54 continually calculates a current dead-reckoning position which is displayed in Mode 5 in terms of latitude and longitude on the Other Data display 50. Furthermore, when in Mode 5, the routine of FIG. 6 for controlling the LED's 30 to 40 is responsive to the latitude and longitude of the calculated dead-reckoning position, rather than of the fixed point, and thus the cursor 12 can be quickly located at the dead-reckoning position on the chart and that position can be plotted.

Mode 6: Set and Drift of Current

In this mode, a display is made of a set and drift which has been entered via the keyboard in the form (set in degrees), SET, (drift in knots), DRIFT. When this data is entered, it is stored for use in calculating an estimated position.

Mode 7: Estimated Position

In addition to calculating a current dead-reckoning position as described above under Mode 5, the CPU 54 similarly calculates a current estimated position which takes into account the set and drift entered as described above under Mode 6, and in Mode 7, the estimated position is displayed. When in Mode 7, the routine of FIG. 6 is responsive to the latitude and longitude of the estimated positions rather than of the fixed point.

Mode 8: Time

In this mode, the current time is displayed on the Other Data display 50. The time can be set when in this mode by entering a time via the keyboard 44 in the form (hours). (minutes). (seconds).

Modes 9, 10, 12 and 14: Way-Points Entry and Display

In each of these modes the latitude and longitude of a respective way-point 1, 2, 3 or 4 can be entered via the keypad in the form (latitude of way-point), N or S, (longitude of way-point), E or W, WAY POINT; and once entered the position of the way-point is stored in the RAM 58 in terms of latitude and longitude and is displayed on the Other Data display 50. Alternatively, a way-point can be set by positioning the cursor 12 at the desired point on the chart and depressing the WAY POINT key without any prior data entry.

When the cursor is operating in mode 9, 10, 12 or 14, the routine of FIG. 6 is responsive to the latitude and longitude of the respective way-point WP1 WP2, WP3 or WP4, rather than of the fixed point, and thus the LED's 30 to 40 can be used quickly to position the cursor 12 at the way-point on the chart.

The way-points remain in memory even if the cursor is re-referenced. Therefore, the latitudes and longitudes of a series of way-points can be set using a small scale chart, and the cursor can then be re-referenced a number of times for a series of large scale chart and the way-points can be plotted on the large scale charts.

Modes 11, 13 and 15: Distance Along and Off Course

Figure 7:
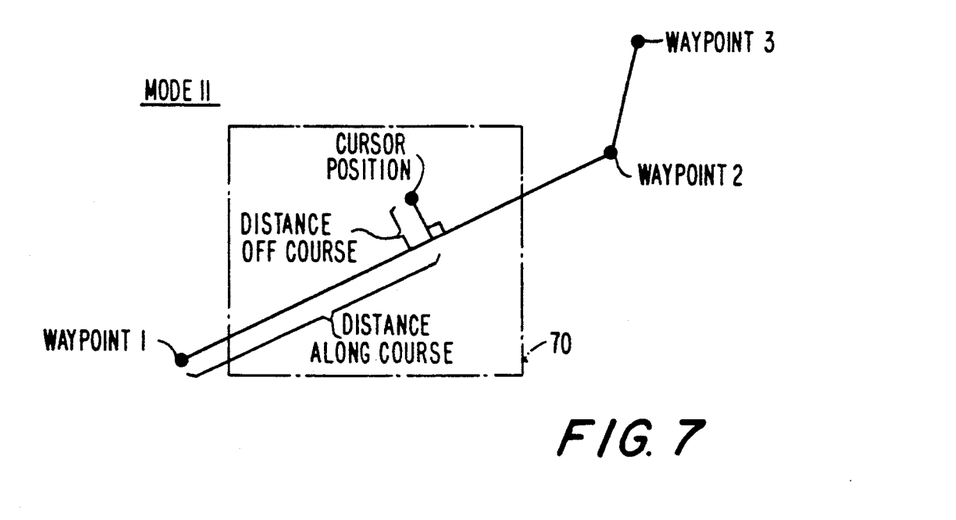
FIG. 7 shows the distances along and off the course between two way-points.

In modes 11, 13 and 15, the CPU 54 calculates the distances (as represented in FIG. 7) in nautical miles of the current cursor position along and off a course between a respective pair of way-points WP1 and WP2, WP2 and WP3, and WP3 and WP4, and two distances are displayed on the Other Data display 50.

The way-points need not necessarily be within the boundary of the chart 16 on the table 10, and the boundary may be as represented by the dot-dash line 70 in FIG. 7.

Whilst the facility to store only four way-points has been described above for the sake of brevity, it will be appreciated that a greater number than that may be provided.

Entering Data by Cursor Movement

Data entry via the keyboard 44, especially when several digits are to be entered, can be tedious and can possibly introduce errors due to mis-keying. As an alternative to data entry in this manner, the CPU 54 is also responsive to movement of the cursor in the x direction of the table 10 as a means of varying data prior to entry. Thus, once the chart 16 has been referenced on the table 10, initial latitude and longitude values are taken to be equal to the latitude and longitude of the current cursor position and initial values of other sorts are taken to be zero. Then, the values can, in turn, be ramped up and down by movement of the cursor 12 in the left and right directions, respectively, across the table. As an example, in order to set way-point 1 off the chart: (i) the cursor is placed on the table; (ii) Mode 9 is selected and the Data Entry display 52 displays the current cursor position; (iii) the displayed latitude is then increased or decreased by moving the cursor 12 to the right or left; (iv) if it is desired to Increase/decrease the value above/below that obtained when the cursor has been moved to the right/left edge of the table, then the cursor is lifted clear of the table and replaced at the left/right edge; (v) once the displayed latitude value is approximately equal to that which it is desired to enter, the FINE key 42 is depressed to make the change in displayed value less sensitive to cursor movement, and the value is finely adjusted; (vi) the N or S key is then depressed to enter the selected latitude value; (vii) steps (iii) to (v) are then repeated for the longitude value; and lastly (viii) the E or W key is de-pressed to enter the selected longitude value. Despite the length of this paragraph, after a small amount or practice by the user, this method of data entry can be surprisingly quick except when large changes need to be made to the values.

Bearings and speeds can be entered similarly.

Calculator

It will be noted from FIG. 2 that the keyboard 44 includes the basic function keys of a calculator, i.e. plus, minus, times, divided by and equals. These keys, in combination with the digit and decimal keys can be used for simple calculations during manual data entry and also for calculations unrelated to the other uses of the cursor.

Bearing Datum

Bearings may be entered and displayed with reference to True North. However, if it is desired to enter and display bearings with respect to some other datum, the difference between True North and the datum may be entered in the following form (bearing offset in degrees), E or W, BEARING OFFSET, and is then stored in the RAM 58. The keypad of the cursor then expects to receive entered bearings with reference to that other datum and converts such entered bearings to being True North referenced before storing them or using them in calculations. Any bearing which is to be displayed is converted to being with reference to that other datum rather than True North before it is displayed. Thus, the local variation of Magnetic North from True North, or the local convergence of Grid North and True North, together with any compass deviation (or error) may be entered as the bearing offset, and then bearings with reference to Magnetic North or Grid North, as the case may be, can be entered and will be displayed.

Modifications

In a development of the referencing system, each chart is provided with a code; three reference points are marked on the chart; and the navigation aid has in memory the latitudes and longitudes of the reference points for each coded chart. Thus, the code can be entered, manually or by means of a bar code and reader, and the cursor placed on the three reference points, whereupon the CPU can set up the mapping system.

The cursor may be adapted for operation with other forms of digitising table for example employing acoustic or optical sensors. Alternatively, the cursor may be connected to a chart table using a pantograph-type pivoted linkage having a pair of potentiometers operably connected at a pair of the linkage pivots such that the position of the cursor can be determined from the potentiometers.

As a modification to the type of digitising table having a grid of wires beneath its surface, the wires may be provided in a flexible sheet which can be spread over a surface, with the chart being spread over or under the flexible sheet. Thus the flexible sheet can be rolled up and stored when not in use. Furthermore, specially adapted charts may be used which have the digitising wires embedded in the thickness of the chart.

The cursor may be adapted to be able to display latitudes and longitudes selectably in (i) degrees and decimal degrees, (ii) degrees, minutes and decimal minutes, and (iii) degrees, minutes and seconds, or indeed in units of other chart co-ordinate systems.

The LED direction displays 30-36 and the transparent disc 22 may be formed as an assembly which is mounted for limited rotation of, for example, 30 degrees either way from the position shown in FIG. 2 so that the cursor may be used at a slight angle to that shown in FIG. 1 in order to suit right or left-handed use.

A different number of LED direction indicators may be used, for example sixteen, or alternatively a completely different form of direction indication may be provided as, for example, by a rotatable needle.

Instead of it being necessary to enter a local magnetic variation in order that the cursor can receive and display bearings with reference to Magnetic North, the cursor may be adapted-to store magnetic variations for a series of positions at different latitudes and longitudes and to use the current cursor position to interpolate between the stored values in producing an estimated current magnetic variation which is used automatically in converting between True North and Magnetic North referenced bearings.

In addition to being able to calculate dead-reckoning and estimate positions, the cursor may also be adapted to as to be able to calculate, from given values for any six of the following seven parameters, the value of the remaining parameter: (i) Start Position; (ii) Finish Position; (iii) Course; (iv) Speed; (v) Elapsed time; (vi) Set; and (vii) Drift.

In a further modification the cursor may be adapted to store tidal stream tables for at least part of the Earth's waters, and the cursor then interpolates from those tables in producing estimated values of local set and drift. The cursor may also be adapted to store the Almanac of astronomical information so that information can be provided by the cursor to assist the user in astronomical observations and calculations.

The cursor may be provided with releasable suckers or some other means of releasably holding the cursor in position on the chart so that when used on, for example, a vessel, the cursor can be fixed to the chart during bad weather to prevent it falling off the table.

Furthermore, the cursor may be linked to the table by a mechanism such as that used for parallel-motion drawing boards so that the cursor is more easily movable in the x and y directions of the table but can be moved with more resistance in other directions across the table.

The external interface 6 described above may be bidirectional so that the cursor can output data, for example stored way-point positions, to other equipment.

Additionally, the directing means may be located other than on the cursor device. For example, the directing means may be provided on the charting surface.

The directing means may comprise indicator means, e.g. indicator lights or loudspeakers, disposed at or near the edges, for example mid-way along the edges, of the charting surface, or a block of indicator lights or one or more arrows disposed on or near the charting surface, for example in a corner thereof. The indication may vary in accordance with the distance to be moved.

Alternatively, a spoken indication may be provided, for example by using a voice chip and loudspeaker associated with the charting surface, which is operable to give spoken directions such as "north", "south", "east", "west" and "on target". The frequency or some other characteristic of the voice may change in accordance with the distance to be moved.

It will be apparent that many other modifications and developments may be made to the arrangement described above whilst still adopting the inventive concepts disclosed in this specification.

We claim:

1. A navigational aid comprising:
   a charting surface (10);
   a cursor device (16) movable over the surface;
   means (10, 64, 66) to provide a signal indicative of the current position of the cursor device on the surface; and
   means (54–58) to convert the current cursor position signal from being in terms of a coordinate system (x, y) of the charting surface to a chart-based signal indicative of the current position of the cursor device in terms of a coordinate system ($\Theta$, $\phi$) of the chart;
   wherein the improvement comprises
   means (58) to store a chart-based signal indicative of a previous current position of the cursor device and a current chart-based signal indicative of the current position of the cursor device so as to perform a desired navigational computation, and means (30–40, 46–52, 60) for providing an indication to the user of the computational result of said processing, wherein
   the processing means is operable to calculate from a stored chart position from the previous current position, and
   the indicating means comprises means (50, 60) to display the distance and bearing.

2. A navigational aid comprising:
   a charting surface (10);
   a cursor device (16) movable over the surface;
   means (10,64,66) to provide a signal indicative of the current position of the cursor device on the surface;
   means (54–58) to convert the current cursor position signal from being in terms of a coordinate system (x,y) of the charting surface to a chart-based signal indicative of the current position of the cursor device in terms of a coordinate system ($\theta,\phi$) of the chart;

means (58) to store the chart-based signal, means (54-58) for processing a stored chart-based signal indicative of a previous current position of the cursor device and a current chart-based signal indicative of the current position of the cursor device so as to perform a desired navigational computation; and means (30-40,46-52,60) for providing an indication to the user of the computational result of said processing.

3. An aid as claimed in claim 2, wherein the store means is arranged to store at least first and second said chart-based signals indicative of, respectively, at least first and second previous current positions of the cursor device.

4. An aid as claimed in claim 3, wherein the processing means is operable to calculate from a current chart-based signal and from said first and second stored chart-based signals the distances of the current position along and off a course from the first to second previous current positions, the indicating means comprising means (50,60) to display the distances along and off the course.

5. A navigational aid as claimed in claim 2, wherein the processing means and the indicating means are operable to display the computational result of said processing in terms of units derivable from the chart coordinate system.

6. An aid as claimed in claim 2, further comprising means to display the current cursor position.

7. A navigational aid according to claim 1, further comprising:

means (44) for manually entering data to the processing means via the cursor device, the data to be entered being variable from an initial value prior to entry in dependence upon movement of the cursor device with respect to the charting surface.

8. An aid as claimed in claim 7, further comprising means to display the data on the cursor device.

9. An aid as claimed in claim 2 further comprising:

means (68) to transmit the chart-based position signal to an external apparatus.

10. An aid as claimed in claim 2, wherein the processing means is operable to determine from a stored chart-based signal and a current chart-based signal the required movement of the cursor device towards the cursor position represented by the stored chart-based signal, the indicating means comprising means (30-40,60) to indicate the required movement.

11. An aid as claimed in claim 10, wherein the indicating means provides the required movement indication on the cursor device (12).

12. An aid as claimed in claim 10, wherein the required movement indication is provided substantially instantaneously and is repeatedly updated.

13. An aid as claimed in claim 11 wherein the required movement indication is provided by indicators of the required movement in two directions at right angles to each other.

14. An aid as claimed in claim 2 and further comprising manual data entry means (44) to enter a navigational position in terms of the chart coordinate system.

15. An aid as claimed in claim 2, and further comprising means (68) to receive an input data signal indicative of a navigational position in terms of the chart coordinate system and to set said input data signal as a stored chart-based signal indicative of a previous current position of the cursor device.

16. An aid as claimed in claim 2 and further including a clock means (67), and means responsive to the clock means, to speed and course signals, and to a defined navigational position signal to determine and display an updated navigational position.

17. An aid as claimed in claim 16, and further comprising manual data entry means to enter the speed and course.

18. An aid as claimed in claim 16, and comprising input means (68) to receive signals indicative of the speed and course.

19. An aid as claimed in claim 16, further comprising manual data entry means to enter corrections to the speed and course, the updated navigational position taking into account the corrections.

20. An aid as claimed in claim 2, wherein the indicating means is provided on the cursor device.

21. An aid as claimed in any of claims 14, 17 or 19 wherein the data entry means is provided on or by the cursor device.

22. An aid as claimed in claim 2, wherein the processing means is operable to calculate from a stored chart-based signal and a current chart-based signal the distance and bearing of the previous current position from the current position, and the indicating means comprising means (50,60) to display the distance and bearing.

23. An aid as claimed in claims 1 or 22, and further comprising means (56, 58) to store a bearing offset, the processing means being operable to add the bearing offset and a determined bearing, and the bearing display means displaying a sum of the determined bearing and the offset.

24. A navigational aid comprising:

a charting surface (10) for use with a chart (16) having a coordinate system ($\theta,\phi$);

a cursor device (12) movable over the surface;

means (10,64,66) to provide a surface-based signal indicative of the current position of the cursor device on the surface in terms of a coordinate system (x,y) of the charting surface;

means (54,56,58) to convert the surface-based signal to provide a chart-based signal indicative of the current position of the cursor device in terms of the chart coordinate system; and means (54, 56, 58, 44 REF) to reference the chart coordinate system with respect to the surface coordinate system in dependence upon the positions ($x_n,x_n$) of at least two points on the surface and the coordinates ($\theta_n,\phi_n$) of those positions in terms of the chart coordinate system, the converting means being responsive to the referencing means to provide the conversion.

25. An aid as claimed in claim 24, wherein the referencing means includes means to input manually the coordinates of said positions in terms of the chart coordinate system.

26. An aid as claimed in claim 25, further comprising means (56, 58) to store for each of a plurality of charts the coordinates of reference points marked on the respective chart, means to retrieve the stored coordinates for a selected one of said charts, and means to reference the selected chart in dependence upon the retrieved coordinates and the positions of the marked reference points on the charting surface.

27. An aid as claimed in claim 24, for use with a chart having marked reference points and coded information of the coordinates of the marked reference points, further comprising means to read the coded information and means for decoding the read coded information to ascertain the co-ordinates of the marked reference points.

* * * * *